W. ZADOROZNY.
DIRIGIBLE HEADLIGHT.
APPLICATION FILED APR. 16, 1919.
1,316,665.
Patented Sept. 23, 1919.
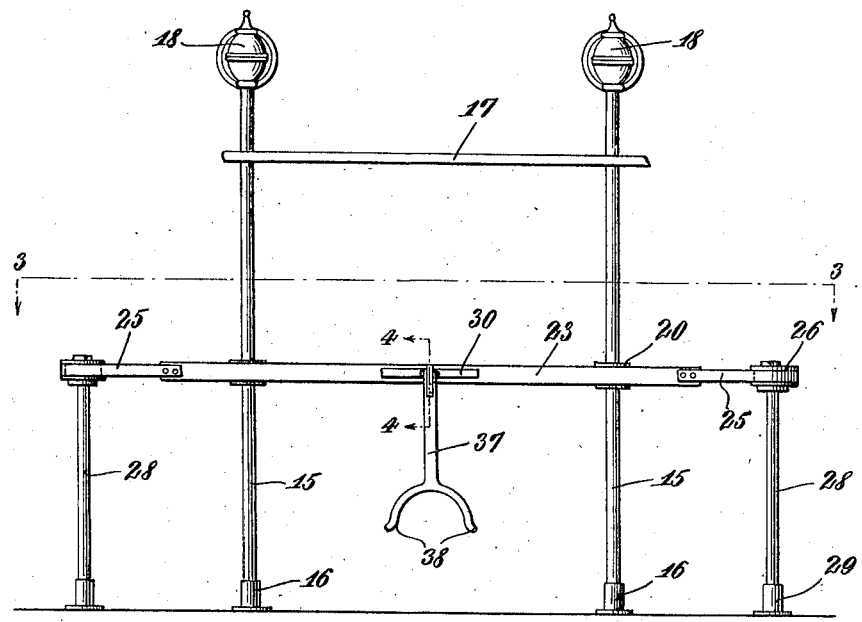
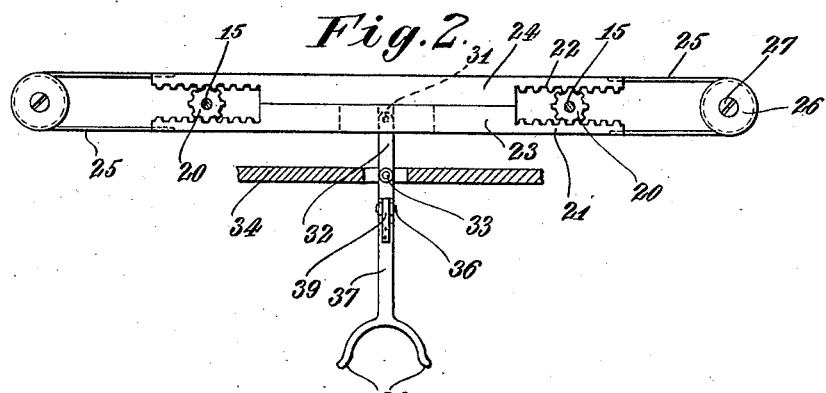
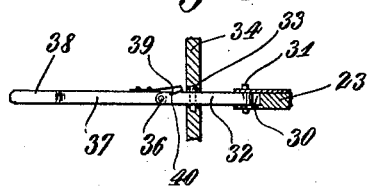
INVENTOR
Wasyl Zadorozny
BY Frederick Myers
his ATTORNEY

UNITED STATES PATENT OFFICE.

WASYL ZADOROZNY, OF MEACHAM, SASKATCHEWAN, CANADA, ASSIGNOR OF ONE-HALF TO TONY ZYGIEL, OF HAMILTON, ONTARIO, CANADA.

DIRIGIBLE HEADLIGHT.

1,316,665.         Specification of Letters Patent.     Patented Sept. 23, 1919.

Application filed April 16, 1919. Serial No. 290,580.

*To all whom it may concern:*

Be it known that I, WASYL ZADOROZNY, a citizen of Austria, residing at Meacham, Province of Saskatchewan and Dominion of Canada, have invented certain new and useful Improvements in Dirigible Headlights, of which the following is a specification.

This invention relates to improvements in dirigible headlights, as applied to vehicles of the automobile type, and has as its special object the provision of means whereby the headlights of the vehicle may be turned in any given direction by a novel and easily operated means, without the removal of the hand of an operator from the controlling devices of the vehicle.

These and other like objects are attained by the novel construction and combination of parts hereinafter described and shown in the accompanying drawnigs, forming a material part of this disclosure, and in which:—

Figure 1 is a rear elevational view of the lights and their controlling means.

Fig. 2 is a horizontal sectional view taken on line 3—3 of Fig. 1, and

Fig. 3 is a fragmentary transverse sectional view taken on line 4—4 of Fig. 1.

Secured upon a fixed portion of the vehicle, immediately in front of the dashboard, are a pair of vertical spindles or standards 15, the same resting in brackets 16, at their bottoms and connected near their upper ends by a transverse element 17, while their upper extremities have secured upon them any preferred type of a lamp 18, caused to glow by a current of electrical energy, or gas as may be preferred.

These spindles 15, have secured upon them, midway in their length, pinions 20, the same being operatively engaged with the teeth of racks 21 and 22, formed with bars 23 and 24, and having engaged at their outer extremities flexible straps 25, which are trained over rollers 26, engaged by pivot screws 27, with standards 28, mounted in brackets 29, extending upward from the flooring or platform, in the same plane as the supporting brackets 16.

In one of the bars 23 is formed an elongated slot 30, and secured therein, by a pin 31, is a lever 32, fulcrumed on a pin 33, set in the dash-board or support plate 34.

Engaged by a pivot pin 36, set in the outer end of the lever 32, is an arm 37, having a forked extremity 38 adapted to receive the knee of an operator when extended horizontally and which may be held in a rigid, outwardly extending position due to a spring catch 39, secured upon the upper surface of the arm 37, and engaging in a recess 40, formed near the outer end of the lever 32.

The pivotal connections 36 act as a hinge whereby the arm and fork may be turned downwardly, out of the way, closely adjacent to the side of the support 34, when the catch 39 is raised, as in entering or leaving the vehicle, while in its normal position it is extended in the manner indicated, and by pressing the knee of an operator therein, laterally, obviously lineal motion will be conducted to the sliding bar 23, causing the teeth of the rack to turn the pinions 20, transmitting rotary motion to the supports 15, turning the lamps in any desired direction, this action being materially aided by the rack 22 engaged with the oppositely disposed bar, and which moves uniformly but in an opposite direction due to its connection with the strap 25.

I claim:—

In a dirigible headlight, the combination with a platform, a pair of standards journaled to rotate vertically thereon, and lamps carried at the upper ends of said standards, of pinions secured upon said standards, bars having racks at their ends engageable with the pinions, said rack bars being arranged in pairs, adapted to slide transversely, pulleys supported adjacent to the ends of said rack bars, flexible straps connecting said rack bars over said pulleys, a lever pivoted in one of said rack bars, a forked lever journaled in said pivoted lever, and means for holding said forked lever normally horizontal, said means permitting the lever to be turned downward.

In testimony whereof I have affixed my signature.

WASYL ZADOROZNY.